United States Patent [19]
Blackburn et al.

[11] Patent Number: 6,018,693
[45] Date of Patent: Jan. 25, 2000

[54] OCCUPANT RESTRAINT SYSTEM AND CONTROL METHOD WITH VARIABLE OCCUPANT POSITION BOUNDARY

[75] Inventors: Brian K. Blackburn, Rochester; Joseph F. Mazur, Washington; Scott B. Gentry, Romeo, all of Mich.

[73] Assignees: TRW Inc.; TRW Vehicle Safety Systems Inc., both of Lyndhurst, Ohio

[21] Appl. No.: 08/931,726

[22] Filed: Sep. 16, 1997

[51] Int. Cl.[7] .............................. G06F 7/70; B60R 21/32
[52] U.S. Cl. .............................. 701/45; 701/36; 280/735; 180/268; 307/10.1
[58] Field of Search .................................. 701/36, 45, 46, 701/47; 280/735, 731, 730.2, 736, 739, 730.1; 340/562, 667, 436, 669; 180/268, 273, 282, 286; 307/10.1

[56] References Cited

U.S. PATENT DOCUMENTS

| | | |
|---|---|---|
| 4,985,835 | 1/1991 | Sterler et al. . |
| 5,002,150 | 3/1991 | Willis ...................................... 180/268 |
| 5,054,574 | 10/1991 | Scroggie et al. .......................... 180/268 |
| 5,071,160 | 12/1991 | White et al. .............................. 280/735 |
| 5,118,134 | 6/1992 | Mattes et al. . |
| 5,203,600 | 4/1993 | Watanabe et al. . |
| 5,330,226 | 7/1994 | Gentry et al. . |
| 5,366,241 | 11/1994 | Kithil . |
| 5,398,185 | 3/1995 | Omura . |
| 5,400,487 | 3/1995 | Gioutsos et al. . |
| 5,413,378 | 5/1995 | Steffens, Jr. et al. . |
| 5,439,249 | 8/1995 | Steffens, Jr. et al. .................... 280/735 |
| 5,445,413 | 8/1995 | Rudolf et al. . |
| 5,446,661 | 8/1995 | Gioutsos et al. . |
| 5,490,069 | 2/1996 | Gioutsos et al. . |
| 5,531,472 | 7/1996 | Semchena et al. ....................... 280/735 |
| 5,626,359 | 5/1997 | Steffens, Jr. et al. .................... 280/735 |
| 5,785,347 | 7/1998 | Adaolph et al. ......................... 280/735 |
| 5,821,633 | 10/1998 | Burke et al. ............................. 307/10.1 |
| 5,829,782 | 11/1998 | Breed et al. .............................. 701/45 |
| 5,848,802 | 12/1998 | Breed et al. ............................. 280/735 |
| 5,871,232 | 2/1999 | White ...................................... 280/735 |

FOREIGN PATENT DOCUMENTS 769171  7/1995  Japan .

OTHER PUBLICATIONS

English Translation of the Abstract of Japanese No. 7–69171.

*Primary Examiner*—Jacques H. Louis-Jacques
*Attorney, Agent, or Firm*—Tarolli, Sundheim, Covell, Tummino & Szabo L.L.P.

[57] ABSTRACT

A restraint system (10) includes an actuatable occupant restraint module (18), which is controlled in a method for restraining a vehicle occupant (12). A restraint control determination function (68) controls actuation of the restraint module (18) using information from a vehicle collision sensor (30). An occupant sensor (34) senses the occupant and provides a signal indicative thereof. A position determination function (46) determines position of the occupant (12) using the signal, and an occupant velocity determination function (70) determines velocity of the occupant relative to a vehicle reference location, as a time derivative of the occupant position. An OOP determination function (52) determines if the occupant (12) is in an occupant out-of-position zone (OOP) (62). If the occupant (12) is within the OOP zone (62), actuation of the restraint module (18) is prevented. A boundary adjustment function (72) repositions a boundary (64) of the OOP zone (62) as a function of the determined occupant velocity. Another embodiment includes an adjustable zone (258), in which adjustable aspect(s) (219) are adjusted.

24 Claims, 5 Drawing Sheets

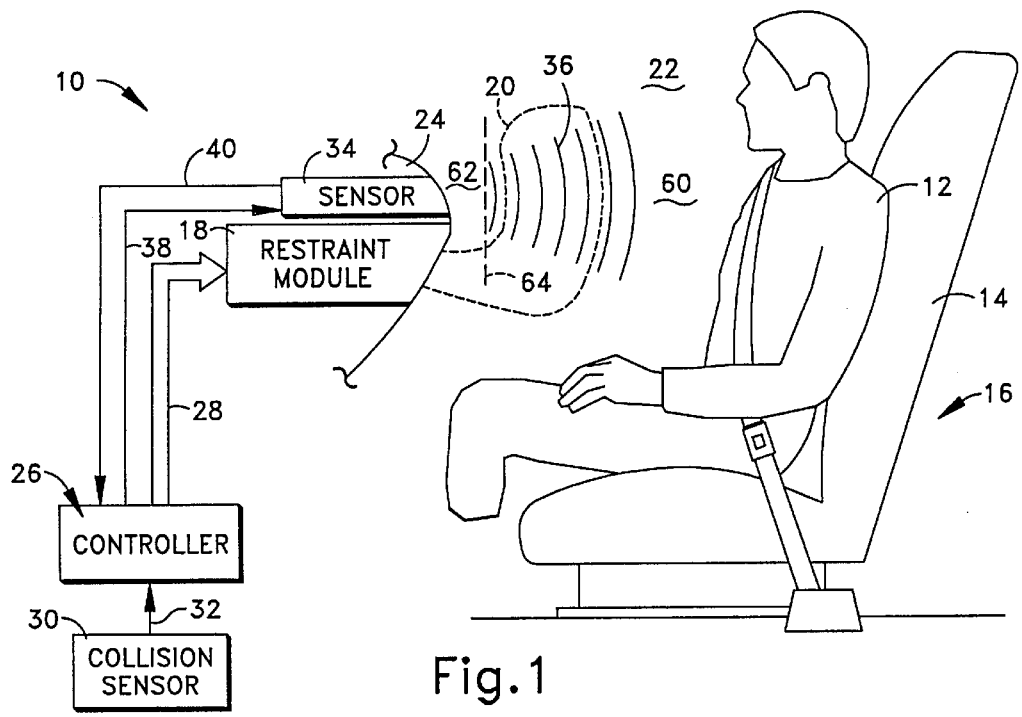
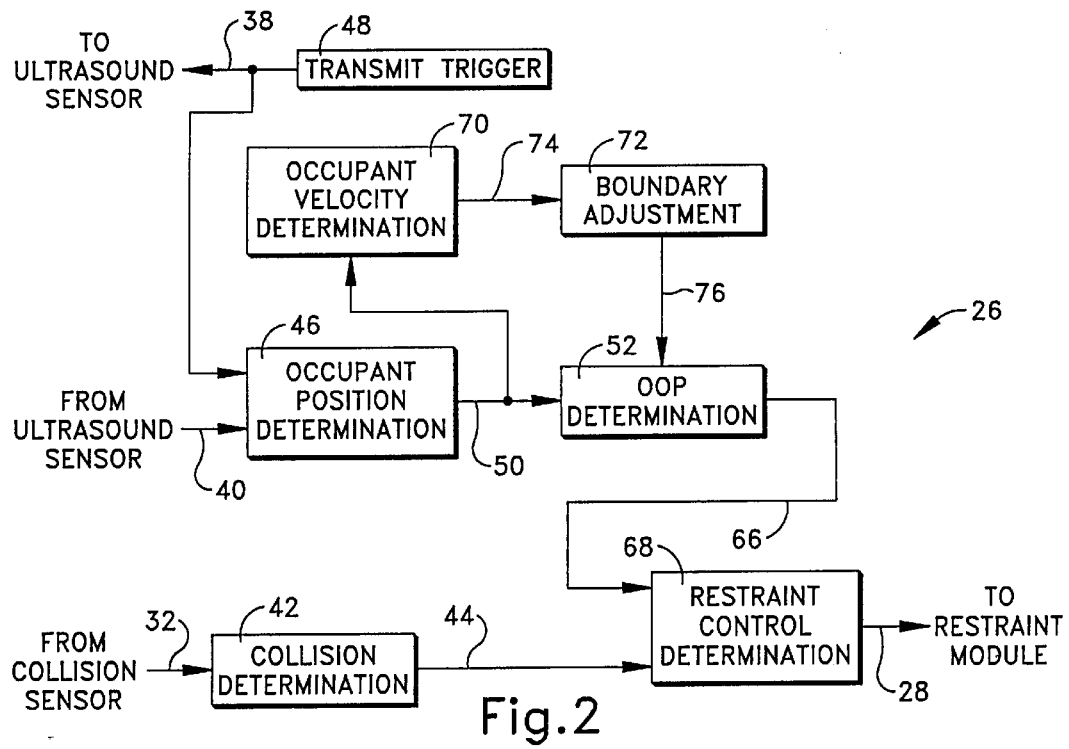

OCCUPANT RESTRAINT SYSTEM AND CONTROL METHOD WITH VARIABLE OCCUPANT POSITION BOUNDARY

TECHNICAL FIELD

The present invention is directed to a vehicle occupant restraint system and is particularly directed to an occupant position boundary, such as an occupant out-of-position boundary, within the system.

BACKGROUND OF THE INVENTION

Occupant restraint systems for use in vehicles are known in the art. One type of restraint system includes an actuatable inflatable restraint module, which has an inflatable restraint that is commonly referred to as an air bag. A controller determines whether the restraint module is to be actuated to inflate the air bag within a vehicle passenger compartment. The restraint module is actuated by the controller upon the occurrence of a predetermined condition for which a vehicle occupant is to be restrained. For example, when a sensor senses a vehicle condition indicative of a deployment collision condition and, in response thereto, the restraint module is actuated.

In certain circumstances, even if the predetermined deployment condition occurs, the restraint system refrains from actuating the restraint module (i.e., the air bag is not inflated). Specifically, if the occupant associated with the restraint module is located in a position such that actuating the restraint module and deploying the air bag will not enhance restraint of the occupant, actuation of the restraint module does not occur. An occupant who is very near the restraint module is referred to as being within an occupant out-of-position zone. Deploying the air bag for an occupant who is within the occupant out-of-position zone will not enhance restraint of the occupant.

A restraint system with restraint control in response to occupant seating conditions is commonly referred to as a "smart" restraint system. Smart restraints control not only deployment of the restraint, but also the timing and manner of deployment. For example, in a smart air bag restraint, the amount of inflation fluid used to inflate the bag is controlled in response to sensed occupant position.

SUMMARY OF THE INVENTION

The present invention provides an occupant restraint system for a vehicle. The system includes restraint means actuatable for restraining a vehicle occupant. The restraint means has a plurality of function levels. Sensor means senses the occupant and provides a signal indicative thereof. Determination means determines position and velocity of the occupant relative to a vehicle reference location, in response to the signal. Actuation control means controls actuation of the restraint means. Level control means, responsive to the determined occupant position, controls the restraint means to be at a first one of its function levels when the occupant is positioned on one side of a boundary located at a predetermined distance from the vehicle reference location and controls the restraint means to be at a second one of its function levels when the occupant is positioned on the other side of the boundary. Adjustment means repositions the boundary relative to the vehicle reference location responsive to the determined occupant velocity.

In accordance with another aspect, the present invention provides a method for controlling an actuatable occupant restraint module in a vehicle occupant restraint system. The restraint module has a plurality of function levels. The occupant is sensed and a signal indicative thereof is provided. Position and velocity of the occupant relative to a vehicle reference location are determined, in response to the signal. Actuation of the restraint module is controlled. The function level of the restraint module is controlled to be at a first one the function levels when the occupant is positioned on one side of a boundary spaced from the vehicle reference location and to be at a second one of the function levels when the occupant is positioned on the other side of the boundary. The boundary relative to the vehicle reference location is adjusted responsive to the determined occupant velocity.

In accordance with another aspect, the present invention provides an occupant restraint system for a vehicle. The system includes restraint means actuatable for restraining a vehicle occupant. Sensor means senses the occupant and provides a signal indicative thereof. Determination means determines position and velocity of the occupant relative to a vehicle reference location, in response to the signal. Actuation control means controls actuation of the restraint means. Enable means, responsive to the determined occupant position, enables the actuation control means to control actuation of the restraint means when the occupant is positioned on one side of a boundary located at a predetermined distance from the vehicle reference location and prevents the actuation control means from causing actuation of the restraint means when the occupant is positioned on the other side of the boundary. Adjustment means repositions the boundary relative to the vehicle reference location as a function of the determined occupant velocity.

In accordance with yet another aspect, the present invention provides a method for controlling an actuatable occupant restraint module in a vehicle occupant restraint system. The occupant is sensed and a signal indicative thereof is provided. Position and velocity of the occupant relative to a vehicle reference location are determined, in response to the signal. Actuation of the restraint module is controlled. Actuation of the restraint module is enabled when the occupant is positioned on one side of a boundary spaced from the vehicle reference location and actuation of the restraint module is prevented when the occupant is positioned on the other side of the boundary. The boundary relative to the vehicle reference location is adjusted as a function of the determined occupant velocity.

BRIEF DESCRIPTION OF THE DRAWINGS

Further features and advantages of the present invention will become apparent to those skilled in the art to which the present invention relates from reading the following description with reference to the accompanying drawings, in which:

FIG. 1 is a schematic illustration of an occupant restraint system in accordance with the present invention within a vehicle;

FIG. 2 is a schematic illustration of a controller of FIG. 1;

DESCRIPTION OF PREFERRED EMBODIMENTS

Figure 3:
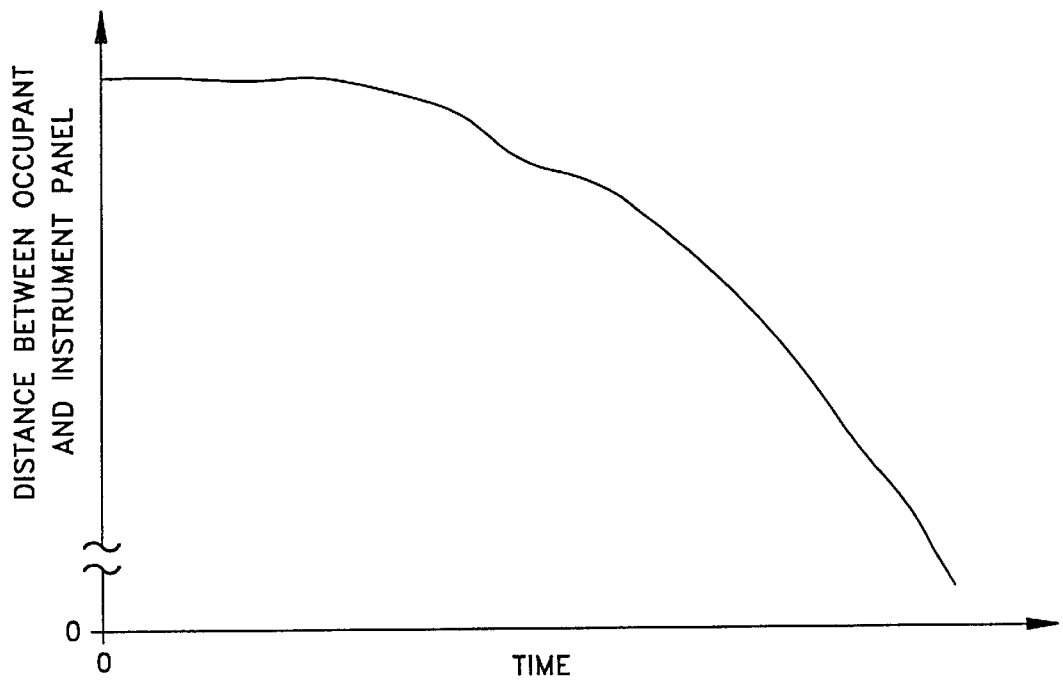
FIG. 3 is a graphical illustration of distance between an occupant and a vehicle instrument panel as a function of time during a vehicle collision.

An occupant restraint system 10 in accordance with the present invention is schematically illustrated in FIG. 1. The system 10 is provided for an occupant 12 seated on a vehicle seat 14 within a vehicle 16. Within the system 10 is an actuatable occupant restraint module 18, which includes an inflatable restraint 20. The inflatable restraint 20 is commonly referred to as an air bag. The air bag 20 is inflatable within an occupant compartment 22 of the vehicle 16.

In the illustrated example, the restraint module 18 is located within a dashboard or instrument panel 24 of the vehicle 16 and is associated with the front passenger seat 14. It will be appreciated by a person of ordinary skill in the art that the restraint module 18 may be another type of actuatable restraint (e.g., a driver's side air bag) and may be located elsewhere with the vehicle (e.g., the steering wheel).

Control of the restraint module 18 is by a controller 26, which provides control signals 28 to the restraint module 18. In one example, the controller 26 is a microcomputer. The controller 26 receives sensory input from several sources and, using the sensory input, makes determinations regarding restraint module control. In the illustrated embodiment, a single controller 26 is illustrated to provide all control functions. It will be appreciated that the functions of the single controller could be split among a plurality of controllers.

One of the sensory input sources for the controller 26 is a sensor 30 that senses a vehicle condition for which the occupant 12 is to be restrained and provides a signal 32 to the controller 26 indicative of the sensed vehicle condition. In one example, which is illustrated in the figures, the sensor 30 is a collision sensor and senses a condition which is indicative of a vehicle collision. Preferably, the collision sensor 30 is an accelerometer, and the signal 32 is an electrical signal having a characteristic indicative of the sensed acceleration (e.g., voltage, frequency, etc.). In another example, the collision sensor 30 senses a condition indicative of a vehicle rollover. It should be appreciated by a person of ordinary skill in the art that the system 10 could have a plurality of sensors providing signals 32 to the controller 26 which are indicative of vehicle conditions for which the occupant 12 is to be restrained. Hereinafter, for the purpose of clarity, only the single collision sensor 30 and its collision indicative signal 32 are discussed.

Another sensory input source for the controller 26 is an ultrasound sensor 34 operatively mounted in the instrument panel 24 so as to sense position of the occupant 12. To sense the occupant position, the ultrasound sensor 34 is energized, via a trigger signal 38, to transmit an ultrasonic energy signal 36 toward the occupant 12. Ultrasonic energy is reflected from the occupant 12 back toward the ultrasound sensor 34. The ultrasound sensor 34 receives the reflected ultrasonic energy and generates a signal 40, which is indicative of the receipt of the "echo."

The ultrasound sensor 34 is illustrated as being located within the instrument panel 24 of the vehicle 16. A person of ordinary skill in the art will appreciate that the ultrasound sensor 34 may be located at any other suitable location within the vehicle 16 for sensing the occupant position. For example, the ultrasound sensor 34 may be located in the seat back of the seat 14. Also, a person of ordinary skill in the art will appreciate that more that one sensor may be used and/or that another type of sensor may be used. For example, an infrared sensor may be used.

Based upon the input signals 32 and 40, the controller 26 provides the control signal 28 to the restraint module 18. The functions performed by the controller 26 are schematically represented by a series of functional blocks in FIG. 2. Specifically, the controller 26 includes a collision determination function 42 (FIG. 2) which receives the signal 32 from the collision sensor 30 and "reads" the value(s) (e.g., voltage amplitude and/or frequency) of the signal 32. The collision determination function 42 includes one or more algorithms for determining whether the vehicle 16 is involved in a deployment collision (i.e., a collision in which it is desirable to actuate the restraint module 18) using the signal 32. For example, if the collision sensor 30 is an accelerometer, the collision determination function 42 includes, in accordance with one embodiment of the present invention, means for integrating the crash acceleration-indicative signal value to provide a calculated crash vehicle velocity. When the crash velocity exceeds a threshold value, the collision determination function 42 concludes that the vehicle 16 is involved in a deployment collision and outputs a signal 44.

The controller 26 includes an occupant position determination function 46. The trigger signal 38, from a transmit trigger signal source 48 of the controller 26, and the signal 40 from the ultrasound sensor 34 are input to the occupant position determination function 46. For each sensor cycle (i.e., transmit/receive), the occupant position determination function 46 calculates the time difference between transmission and echo receipt and, in turn, determines the distance between the occupant and the instrument panel 24. It will be appreciated that appropriate filters are employed to filter the position data such that spurious movement (e.g., arm waving) is not interpreted as movement of the occupant "as a whole". The occupant position determination function 46 outputs a signal 50 having a value indicative of the distance. The signal 50 is provided to an occupant out-of-position ("OOP") determination function 52 of the controller 26 which determines whether the occupant is currently located within an occupant OOP zone 62 (FIG. 1).

The OOP zone 62 is a region or location within the occupant compartment 22 adjacent to the instrument panel 24 and bounded by an OOP boundary 64 (i.e., that region between the instrument panel 24 and the OOP boundary 64). The OOP boundary 64 is located at a distance spaced from the instrument panel 24 (i.e., the instrument panel, with the affixed ultrasound sensor 34, is the reference location from which the distance to the OOP boundary is measured). The OOP boundary 64 separates the OOP zone 62 from an occupant in-position zone 60. Actuating the restraint module 18 to inflate the air bag 20 would not enhance the restraint of an occupant located within the OOP zone 62. The OOP determination function 52 (FIG. 2) outputs a signal 66, which is indicative of whether the occupant is currently located within the OOP zone 62 (i.e., indicative of the occupant being outside or inside of the OOP boundary 64).

The signals 44 and 66, from the collision determination function 42 and the OOP determination function 52, respectively, are input to a restraint control determination function 68. If the signal 44 indicates that the restraint module 18 should be actuated and the signal 66 indicates that the occupant 12 is outside of the OOP zone 62, then the restraint control determination function 68 outputs the control signal 28 to the restraint module 18 to cause actuation.

However, if the signal 44 does not indicate that the restraint module 18 should be actuated and/or the signal 66 indicates that the occupant 12 is inside of the OOP zone 62, then the restraint control determination function 68 does not output the control signal 28 to the restraint module 18.

Focusing now on the occupant 12, the occupant may be in the OOP zone 62 either because (1) the occupant has shifted position (e.g., the occupant is leaning toward the instrument panel 24), (2) the occupant is displaced during a vehicle braking, via inertia, or (3) the occupant is displaced during a vehicle collision, via inertia. Specifically, during a sudden, large braking situation or a vehicle collision, the vehicle 16 decelerates and the inertia of the occupant 12 causes the occupant to move forward relative to the seat 14 toward the instrument panel 24. Such movement can be relatively large if the occupant 12 is not using a seat belt system. Further, a person of ordinary skill in the art will appreciate that even a vehicle occupant using a seat belt system moves some amount during large deceleration.

An example plot of the distance between an un-belted occupant and an instrument panel during a frontal vehicle collision is shown in FIG. 3. In the plot of FIG. 3, the beginning of the collision is at time equals zero. During an initial time period, the position (i.e., the distance to the instrument panel) of the occupant is relatively constant. Subsequently, as the vehicle continues to be decelerated, the inertial force of the occupant overcomes the static force(s) holding the occupant (e.g., friction between the occupant and the seat bottom), and the distance between the occupant and the instrument panel decreases.

During deceleration-induced movement of the occupant relatively toward the instrument panel 24, the time required for the occupant (if not restrained) to move from an initial position to the instrument panel is dependent upon the initial position of the occupant and the velocity of the occupant during the movement. In accordance with the present invention, the OOP zone 62 is adjusted as a function of the velocity of the occupant. In accordance with a preferred embodiment, the OOP boundary 64 is shifted away from the instrument panel 24 and toward the seat 14 in response to increasing occupant velocity.

To adjust the OOP boundary 64, the controller 26 includes an occupant velocity determination function 70 and a boundary adjustment function 72. The signal 50 output from the occupant position determination function 46 is provided as an input to the occupant velocity determination function 70. A time derivative of the value indicative of the occupant position is calculated by the velocity determination function 70 to provide an occupant velocity value relative to the reference frame of the vehicle. The occupant velocity determination function 70 outputs a signal 74 indicative of occupant velocity to the boundary adjustment function 72.

Within the boundary adjustment function 72, an OOP boundary adjustment value is generated in response to the occupant velocity. The OOP boundary adjustment value is a distance value used to increase the OOP boundary value. The OOP boundary value is a distance value, measured from the point of reference (i.e., the instrument panel 24) for the OOP zone 62. Thus, increasing the OOP boundary value by the OOP boundary adjustment value increases the size of the OOP zone 62. An occupant moving forward, toward the instrument panel 24, at a relatively fast speed will have the associated OOP boundary 64 shifted rearward, away from the instrument panel 24. Accordingly, the controller 26, via adjustment of the OOP boundary 64, increases the distance range from the instrument panel 24 to the occupant 12.

Within the controller 26, the OOP determination function 52 always starts with an initial, default OOP boundary value. For example, the initial OOP zone 62 is eight (8) inches from the instrument panel 24. The boundary adjustment function 72 outputs at 76 the adjustment value, which is used to adjust the OOP boundary value in the OOP determination function 52. Once the OOP determination function 52 has a new (i.e., adjusted) OOP boundary value, the determination as to whether the occupant is located within the OOP zone 62 uses the new OOP boundary value. The OOP boundary value is used by the OOP determination function 52 until the value is changed or reset to the default value.

Figure 4:
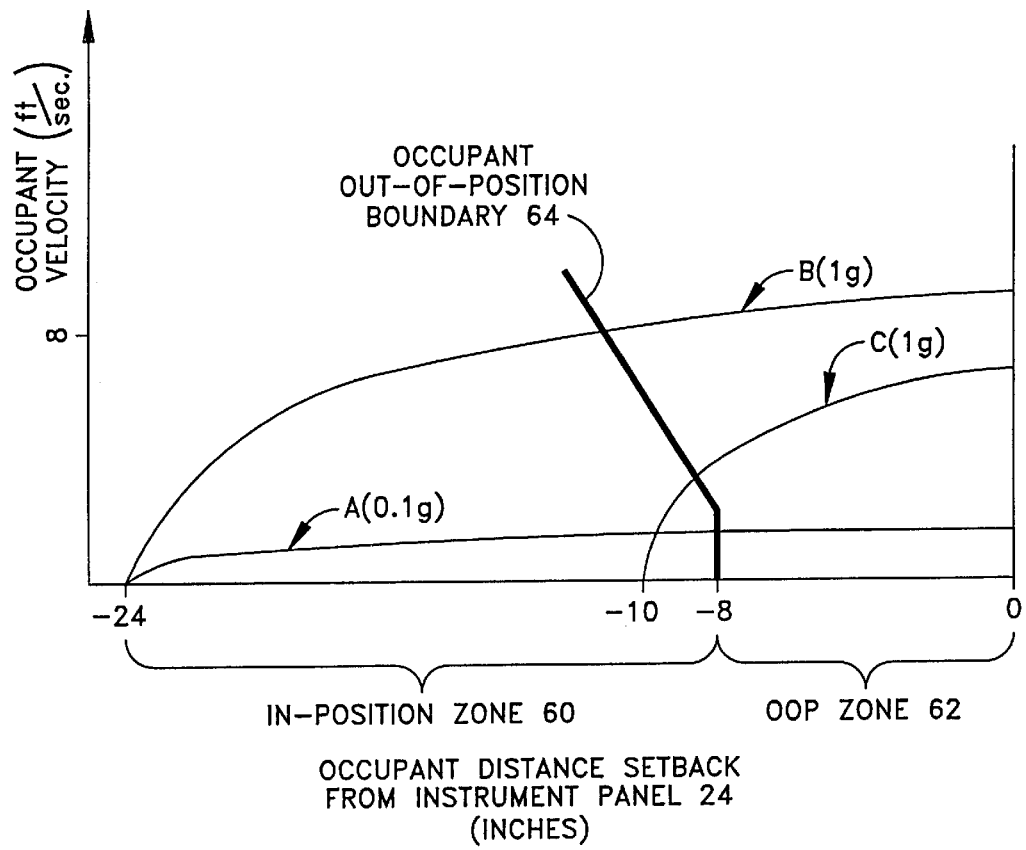
FIG. 4 is a graphical illustration of distance setback of the occupant from the instrument panel as a function of occupant velocity for several collision situations including a variable occupant out-of-position boundary.

FIG. 4 illustrates three examples of occupant movement. The first example is for an occupant A (trace A in FIG. 4) who is initially (i.e., at the beginning of the vehicle collision) set-back twenty-four (24) inches from the instrument panel 24 and is subjected to a 0.1 g force as a result of the vehicle collision. An initial, default OOP boundary 64 of eight (8) inches from the instrument panel 24 is not changed in response to the occupant velocity. Basically, the occupant is not moving at a velocity, which would require adjustment of the OOP zone 62.

The second example is for an occupant B (trace B in FIG. 4) who is initially setback twenty-four (24) inches from the instrument panel 24, and is subjected to a 1.0 g force as a result of the vehicle collision. The default OOP boundary 64 of eight (8) inches from the instrument panel 24 is changed in response to the occupant velocity. In the reference frame of the vehicle, the occupant is accelerating, and the controller 26 moves the OOP boundary rearward as the occupant velocity increases. In this example, the occupant will reach the repositioned OOP boundary 64, which is approximately eleven (11) inches from the instrument panel 24 when the occupants velocity is approximately eight (8) feet per second.

The third example is for an occupant C (trace C in FIG. 4) who is initially setback ten (10) inches from the instrument panel 24 and subjected to a 1.0 g force as a result of the vehicle collision. The default OOP boundary 64 of eight (8) inches from the instrument panel 24 is changed in response to the occupant velocity. The OOP boundary 64 is moved rearward, but the occupant reaches the OOP boundary sooner than the occupant B (of the second example) reaches the OOP boundary. Accordingly, the OOP boundary 64 is not changed (i.e., shifted rearward) as much as in the second example.

Figure 5:
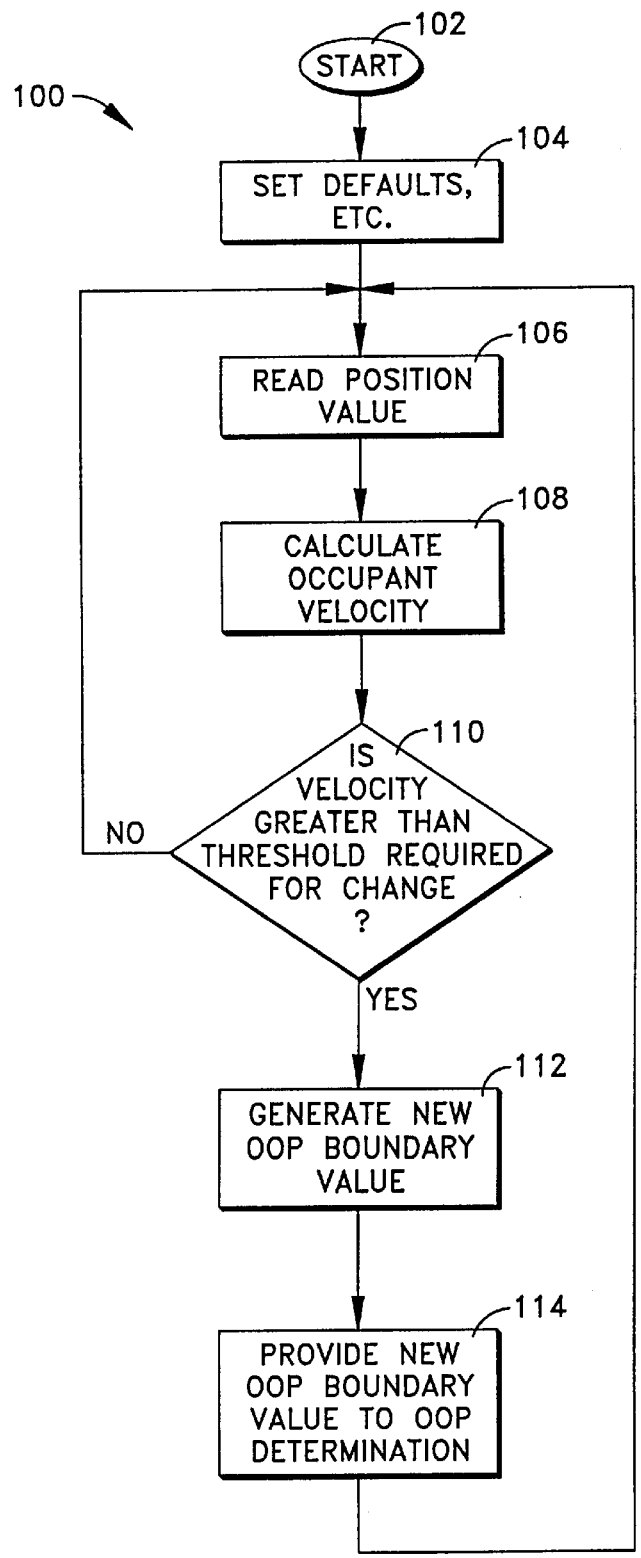
FIG. 5 is a flow chart illustrating a process performed within the controller of FIG. 1.

A process 100 performed by the controller 26 in performing functions 46, 70, and 72, in accordance with the present invention, is shown in FIG. 5. The process 100 is initiated at step 102 and proceeds to step 104. At step 104, the OOP boundary value is set at the default value (e.g., 8 inches). At step 106, the occupant position value is read (i.e., the value of the signal 50 is read). At step 108, the occupant velocity is calculated (i.e., the time derivative of the occupant position).

At step 110, it is determined whether the occupant velocity is greater than a preset threshold value. If the determination at step 110 is negative (i.e., occupant velocity is zero or below the threshold), the process 100 loops back to step 106. If the determination at step 110 is affirmative, the process goes to step 112, in which a new OOP boundary value is generated using the occupant velocity. Specifically, an OOP boundary adjustment value is calculated by subtracting the threshold from the velocity and multiplying the resulting difference times a proportionality factor. The proportionality factor, which establishes the slope of the upper segment of the OOP boundary line shown in FIG. 4, is fixed in the embodiment being described. The OOP boundary adjustment value thus calculated is then added to the default OOP boundary value to provide a new OOP boundary value. At step 114, the new OOP boundary value is provided for use in determining if the occupant is within the OOP zone 62. Once step 114 is complete, the process 100 jumps to step 106.

If the same microprocessor is used for all of the functions illustrated in FIG. 2, then additional steps will need to be included in the flowchart to implement the functions. These additional steps (for crash detection or discrimination) are well known in the art and will not be described in detail.

Alternatively, the functions represented by blocks 46, 48, 52, 70 and 72 may be performed by a separate microprocessor-controlled "occupant sensing" module, in which case the microprocessor would perform the steps illustrated in FIG. 5 and would provide control signals 66 to the "restraint control" module performing the other illustrated functions.

In the embodiment described above, an OOP boundary adjustment value is calculated from the velocity. The calculation uses a proportionality factor because the relationship between occupant velocity (over a threshold) and OOP boundary adjustment value is linear. In some cases it may be preferable to use the occupant velocity to access a look-up table for the appropriate OOP value rather than calculating the OOP boundary value in the manner described. This will be particularly true where the boundary value is not a linear function of velocity, but rather has some more complicated correlation with velocity. Also, it will be appreciated that different boundary curves are derived for different vehicle types, styles, etc. Thus, different vehicles have different OOP boundary curves.

Also, it will be appreciated that a boundary for any other type of "zone" (i.e., other than an OOP zone in which actuation of a restraint module is prevented) is adjustable in accordance with the present invention. Specifically, the adjustable boundary separates occupant position zones that are associated with different manners of air bag deployment. For example, the zone on the outside of the adjustable boundary is associated with inflation of the air bag with a full amount of available inflation fluid and the zone on the inside of the boundary is associated with inflation of the air bag with a partial amount of the available inflation fluid.

The various types of zones for which the boundary is adjusted in accordance with the present invention are referred to as function level zones, and are associated with different function levels of the restraint module 18. Each function level of the restraint module 18 is a level in which the action/deployment of the air bag is different from the other level(s). Thus, as presented via the first illustrated embodiment, "no actuation of the air bag" is a function level of the restraint module 18. Each zone change has an associated boundary, and a plurality of boundaries can be adjusted. An example embodiment, in accordance with the present invention, which includes a plurality of adjustable boundaries, is shown in FIG. 6.

Figure 6:
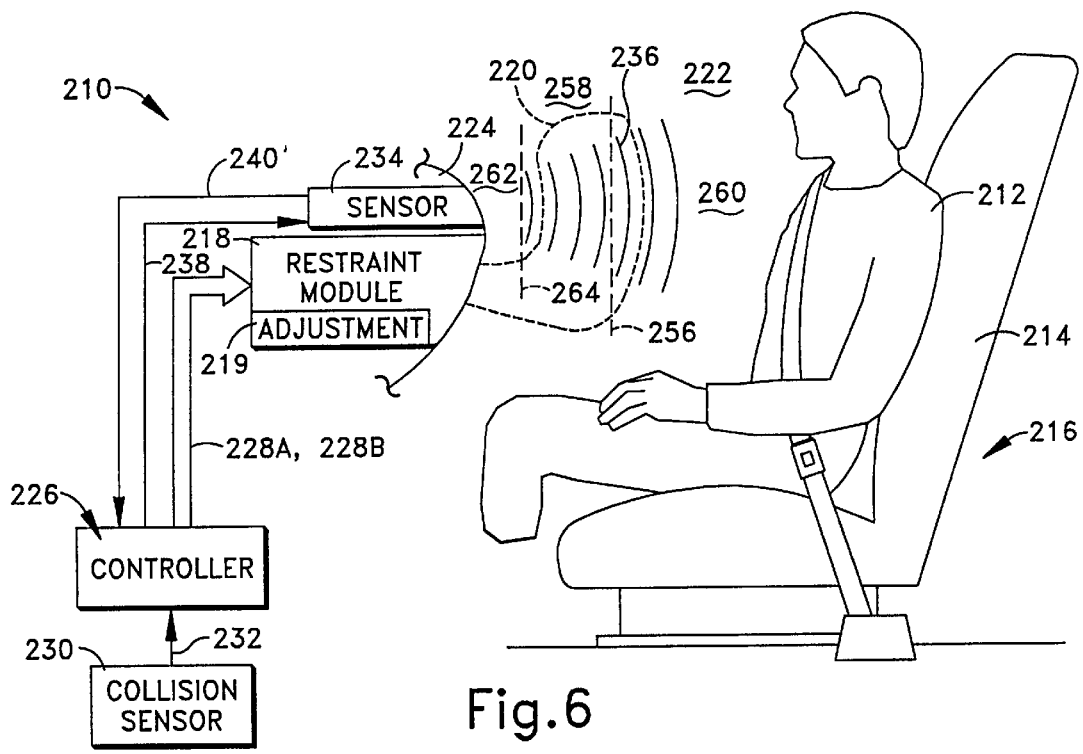
FIG. 6 is a schematic illustration of a second embodiment in accordance with the present invention.

The embodiment shown in FIG. 6 is similar to the embodiment shown in FIG. 1. The structure in the embodiment of FIG. 6 is identified with a "2" prefix attached to the numbers used to identify structure in FIG. 1. Accordingly, the identifying reference numerals are in the range of two hundred for FIG. 6. The elements of FIG. 6 are the same as their two-digit counterpart, except where specifically discussed. Further, the embodiment of FIG. 6 has additional structure.

Specifically, in the second embodiment, the restraint module 218 has one or more adjustable aspects 219. Such adjustable aspect(s) 219 relate to adjustment of the deployment of the air bag (i.e., vary between different function levels). Examples of deployment adjustment include adjustment of inflation timing, adjustment of inflation pressure, and adjustment of location of the inflated air bag relative to the occupant 112. A specific example of adjustment to inflation timing is selection of a time period between a determination to actuate the restraint module 218 and an initiation of air bag inflation.

A specific example of adjustment of inflation pressure is control of an inflation fluid source to provide a variable amount of inflation fluid to the air bag. Another specific example of adjustment of inflation pressure is control of a pressure relief valve, which vents the air bag. A specific example of adjustment of air bag positioning is control of positioning motors operative to move the air bag housing. Another specific example of adjustment of air bag positioning is moving the entire restraint module toward or away from the occupant and/or moving the occupant toward or away from the restraint module. Dynamic profile control is accomplished by directing inflation fluid into the air bag in predetermined zones within the air bag or by control of the number and timing of a plurality of inflation sources and vents.

Control of the restraint module to adjust the adjustable aspect(S) 219 is by the controller 226. The controller 226 provides control signals 228A to control actuation of the restraint module 218, similar to the first embodiment, and provides control signals 228B to control the adjustable aspect(S) 219.

The adjustable aspect(S) 219 change/adjust the deployment of the air bag from one function level, in the occupant in-position zone 260, to another function level, in an intermediate zone 258. The intermediate zone 258 is located between the OOP zone 262 and the occupant in-position zone 260. The intermediate zone 258 is separated from the OOP zone 262 by the OOP boundary 264, and is separated from the in-position zone 260 by an intermediate boundary 256. The intermediate zone 258 is an area in which the deployment level associated with the occupant in-position zone 260 would not enhance the restraint of an occupant located within the intermediate zone. For example, the deployment level associated with the in-position zone 260 is inflation of the air bag with a full amount of available inflation fluid, and is referred to as a high level deployment. The deployment level associated with the intermediate zone 258 is inflation of the air bag with a partial amount of available inflation fluid, and is referred to as a low level deployment.

Figure 7:
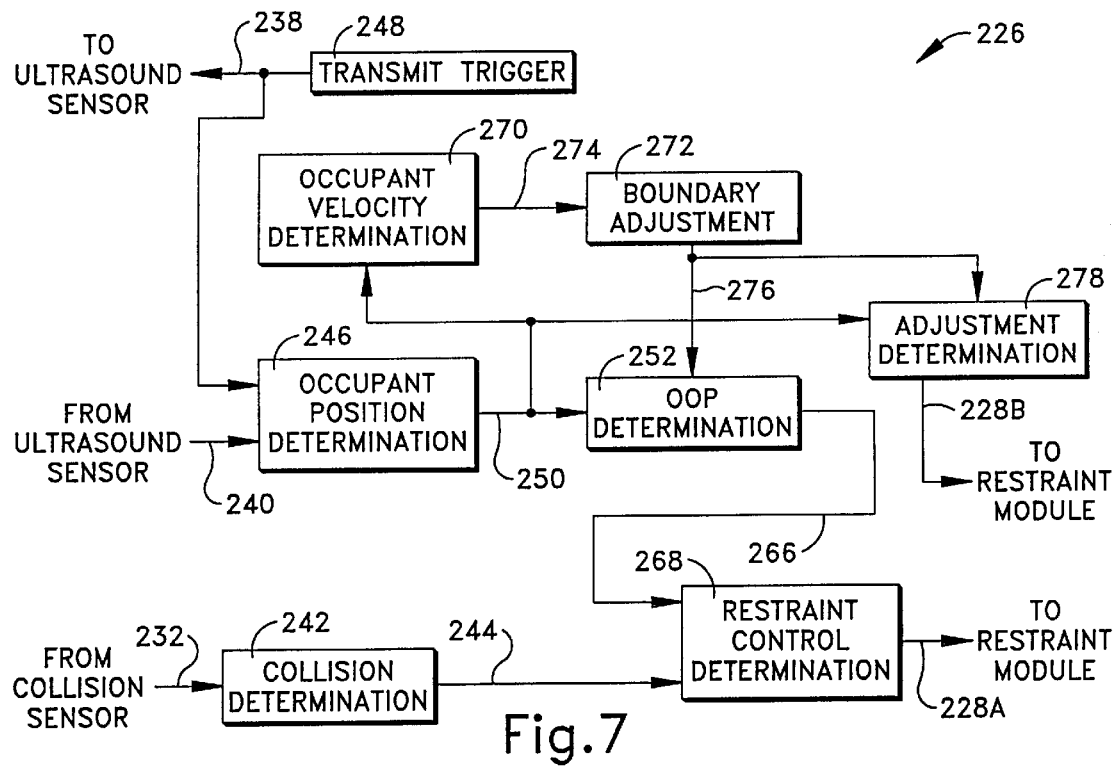
FIG. 7 is a schematic illustration of a controller of FIG. 6.

The controller 226 includes an adjustment determination function 278 (FIG. 7) which provides the signal 228B to adjust the adjustable aspect(S) 219 of the restraint module 218. Specifically, in the example embodiment shown in FIG. 7, the output signal 250 from the occupant position determination function 246 (which is indicative of the occupant position) is provided as an input to the adjustment determination function 278. The adjustment determination function 278 determines whether the position of the occupant 212 is within the intermediate zone 258 (i.e., the adjustment determination function determines whether the distance between the occupant 212 and the instrument panel 224 is less than the distance between the instrument panel 224 and the intermediate boundary 256). Of course, the OOP determination function 252 of the controller 226 determines if the occupant 212 goes from the intermediate zone 258 into the OOP zone 262. If the position of the occupant is in the OOP zone 262, the signal 266 is provided to the restraint control determination function 268 such that air bag deployment is prevented.

In accordance with the present invention, the intermediate boundary 256 is adjusted as a function of the velocity of the occupant. In a preferred embodiment, the intermediate boundary 256 is shifted away from the instrument panel 224 and toward the seat 214 in response to increasing occupant velocity.

To adjust the intermediate boundary 256, the controller 226 includes a boundary adjustments function 272. The boundary adjustments function 272 receives the occupant velocity indicative signal 274 from the occupant velocity determination function 270. Within the boundary adjustments function 272, a boundary adjustment value is generated in response to the occupant's velocity. The boundary adjustment value is a distance value used to increase both the OOP boundary value and the intermediate boundary value.

Figure 8:
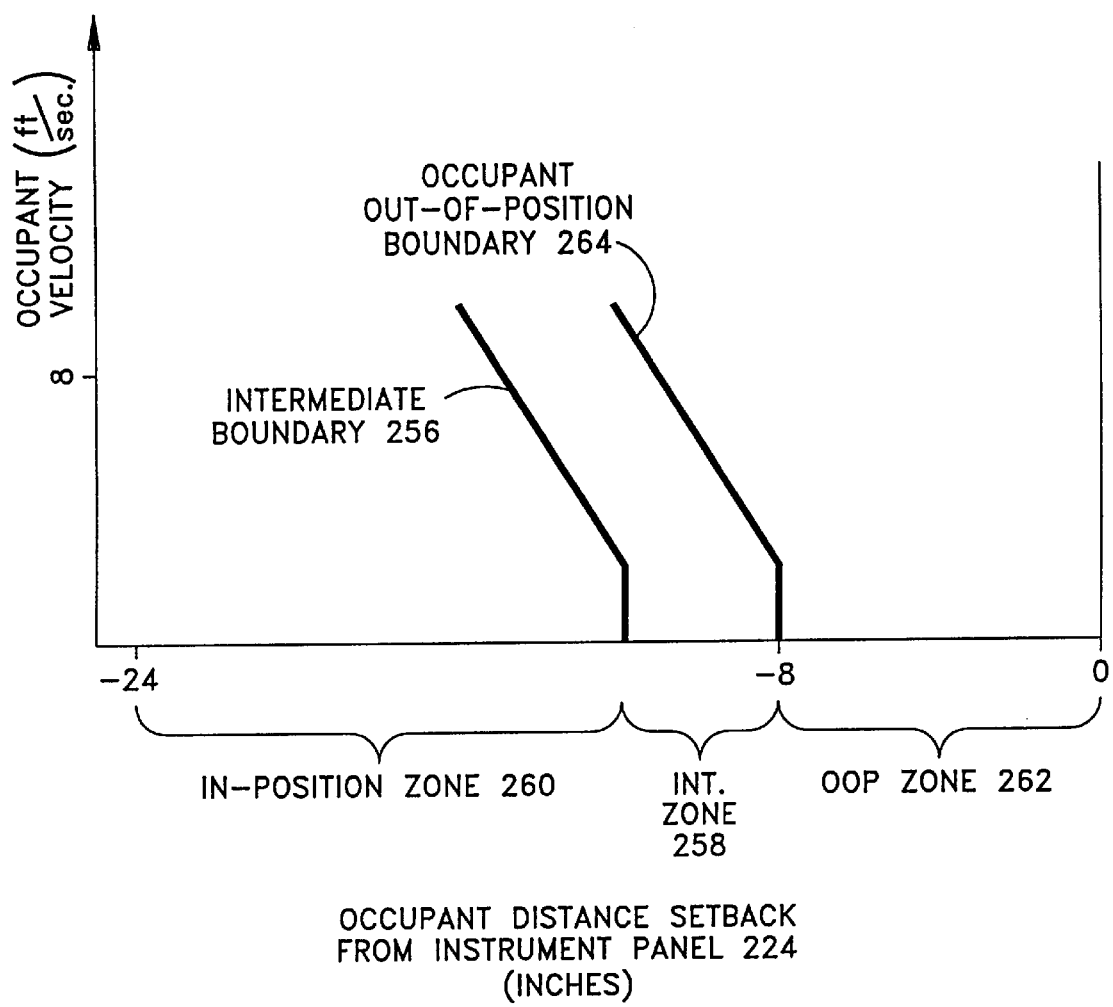
FIG. 8 is a graphical illustration similar to FIG. 4 and shows a plurality of boundaries.

In the disclosed embodiment, both the OOP boundary 264 and the intermediate boundary 256 are shifted away from the instrument panel 224 as occupant velocity increases above a threshold velocity (see FIG. 8). Further, as shown in FIG. 8, both the OOP boundary 264 and the intermediate boundary 256 are shifted at the same rate per unit of occupant velocity increase. It will be appreciated that the boundaries may be shifted at different rates.

From the above description of the invention, those skilled in the art will perceive improvements, changes and modifications. Such improvements, changes, and modifications within the skill of the art are intended to be covered by the appended claims.

Having described the invention, the following is claimed:

1. A vehicle occupant restraint system comprising:
   restraint means actuatable for restraining a vehicle occupant, said restraint means having a plurality of function levels;
   sensor means for sensing the occupant and providing a signal indicative thereof;
   determination means for determining position and velocity of the occupant relative to a vehicle reference location, in response to the signal;
   actuation control means for controlling actuation of said restraint means;
   level control means, responsive to the determined occupant position, for controlling said restraint means to be at a first one of said function levels when the occupant is positioned on one side of a boundary located at a predetermined distance from the vehicle reference location and for controlling said restraint means to be at a second one of said function levels when the occupant is positioned on the other side of the boundary; and
   adjustment means for repositioning the boundary relative to the vehicle reference location responsive to the determined occupant velocity.

2. A system as set forth in claim 1, wherein said first function level of said restraint means is actuation of said restraint means to deploy and said second function level of said restraint means is non-actuation of said restraint means.

3. A system as set forth in claim 2, wherein said level control means includes means for enabling said actuation control means to control actuation of said restraint means when the occupant is positioned outside of the boundary relative to the vehicle reference location and for preventing said actuation control means from causing actuation of said restraint means when the occupant is positioned inside of the boundary.

4. A system as set forth in claim 1, wherein said adjustment means includes means for increasing distance between the boundary and the vehicle reference location as occupant velocity increases.

5. A system as set forth in claim 1, wherein said determination means includes means for determining a time derivative of the position of the occupant to provide the occupant velocity.

6. A system as set forth in claim 1, wherein said first function level of said restraint means is actuation of said restraint means to deploy at a high level and said second function level of said restraint means is actuation of said restraint means to deploy at a low level.

7. A method for controlling an occupant restraint module in a vehicle occupant restraint system, the restraint module having a plurality of function levels, said method comprising:
   sensing an occupant and providing a signal indicative thereof;
   determining position and velocity of the occupant relative to a vehicle reference location, in response to the signal;
   controlling the restraint module, including controlling actuation of the restraint module, and controlling the function level of the restraint module to be at a first one the function levels when the occupant is positioned on one side of a boundary spaced from the vehicle reference location and to be at a second one of the function levels when the occupant is positioned on the other side of the boundary; and
   repositioning the boundary relative to the vehicle reference location responsive to the determined occupant velocity.

8. A method as set forth in claim 7, wherein the first function level of the restraint module is actuation of the restraint module to deploy and the second function level of the restraint module is non-actuation of the restraint module.

9. A method as set forth in claim 8, wherein the controlling step includes enabling actuation of the restraint module for the first function level when the occupant is positioned outside of the boundary relative to the vehicle reference location and preventing actuation of the restraint module for the second function level when the occupant is positioned inside of the boundary.

10. A method as set forth in claim 7, wherein said step of repositioning the boundary includes increasing the distance between the boundary and the vehicle reference location as occupant velocity increases.

11. A method as set forth in claim 7, wherein said step of determining velocity includes determining a time derivative of the position of the occupant to provide the occupant velocity.

12. A method as set forth in claim 7, wherein the first function level of said restraint module is actuation of the restraint module to deploy at a high level and the second function level of the restraint module is actuation of the restraint module to deploy at a low level.

13. A vehicle occupant restraint system comprising:
   restraint means actuatable for restraining a vehicle occupant;
   sensor means for sensing the occupant and providing a signal indicative thereof;
   determination means for determining position and velocity of the occupant relative to a vehicle reference location, in response to the signal;

actuation control means for controlling actuation of said restraint means;

enable means, responsive to the determined occupant position, for enabling said actuation control means to control actuation of said restraint means when the occupant is positioned on one side of a boundary located at a predetermined distance from the vehicle reference location and for preventing said actuation control means from causing actuation of said restraint means when the occupant is positioned on the other side of the boundary; and adjustment means for repositioning the boundary relative to the vehicle reference location as a function of the determined occupant velocity.

14. A system as set forth in claim 13, wherein said enable means includes means for enabling said actuation control means to control actuation of said restraint means when the occupant is positioned outside of the boundary relative to the vehicle reference location and for preventing said actuation control means from causing actuation of said restraint means when the occupant is positioned inside of the boundary.

15. A system as set forth in claim 13, wherein said adjustment means includes means for increasing distance between the boundary and the vehicle reference location as occupant velocity increases.

16. A system as set forth in claim 13, wherein said determination means includes means for determining a time derivative of the position of the occupant to provide the occupant velocity.

17. A system as set forth in claim 13, wherein said restraint means includes an inflatable restraint.

18. A system as set forth in claim 13, wherein said sensor means includes an ultrasound sensor.

19. A method for controlling an occupant restraint module in a vehicle occupant restraint system, said method comprising:

sensing an occupant and providing a signal indicative thereof;

determining position and velocity of the occupant relative to a vehicle reference location, in response to the signal;

controlling actuation of the restraint module;

enabling actuation of the restraint module when the occupant is positioned on one side of a boundary spaced from the vehicle reference location and preventing actuation of the restraint module when the occupant is positioned on the other side of the boundary; and repositioning the boundary relative to the vehicle reference location as a function of the determined occupant velocity.

20. A method as set forth in claim 19, wherein the controlling step is performed by a controller and wherein said step of enabling actuation of the restraint module includes enabling the controller to control actuation of the restraint module when the occupant is positioned outside of the boundary relative to the vehicle reference location and preventing the controller from causing actuation of the restraint module when the occupant is positioned inside of the boundary.

21. A method as set forth in claim 19, wherein said step of repositioning the boundary includes increasing the distance between the boundary and the vehicle reference location as occupant velocity increases.

22. A method as set forth in claim 19, wherein said step of determining velocity includes determining a time derivative of the position of the occupant to provide the occupant velocity.

23. A method as set forth in claim 19, wherein the restraint means includes an inflatable restraint.

24. A method as set forth in claim 19, wherein the step of sensing includes using an ultrasound sensor.

* * * * *